May 12, 1970 A. A. DI PILLA 3,511,954
PUSHBUTTON ASSEMBLY MEANS, CASING, AND LOCKING MEANS
Filed Jan. 25, 1968 5 Sheets-Sheet 1

INVENTOR.
ANTHONY A. DiPILLA
BY
*Candor & Candor*
HIS ATTORNEYS

May 12, 1970 A. A. DI PILLA 3,511,954
PUSHBUTTON ASSEMBLY MEANS, CASING, AND LOCKING MEANS
Filed Jan. 25, 1968 5 Sheets-Sheet 2

INVENTOR.
ANTHONY A. DiPILLA
BY
HIS ATTORNEYS

United States Patent Office 3,511,954
Patented May 12, 1970

3,511,954
PUSHBUTTON ASSEMBLY MEANS, CASING,
AND LOCKING MEANS
Anthony A. Di Pilla, Philadelphia, Pa., assignor to
Robertshaw Controls Company, Richmond, Va., a corporation of Delaware
Filed Jan. 25, 1968, Ser. No. 700,627
Int. Cl. H01h 9/18
U.S. Cl. 200—167                                26 Claims

ABSTRACT OF THE DISCLOSURE

A pushbutton assembly means has an actuator means and a lamp holder means that can be inserted as a unit into a casing. The actuator and lamp holder are relatively movable to each other. When the actuator is pushed in and released, the lamp holder is automatically locked in the casing. The pushbutton assembly then cannot be removed until after the actuator is first pulled out, then pushed in and released, then lifted out of the casing.

---

This invention relates to a pushbutton assembly means, casing, and locking means.

A feature of this invention includes a pushbutton means or pushbutton assembly means having an actuator or actuator means and lamp holder means, or lamp holder assembly means, that are insertable as a unit into an aperture in the casing. When they are inserted and released they are automatically locked in the casing. Thereafter they cannot be removed from the casing without first pulling out the actuator, then pushing in the actuator and then removing the actuator and lamp holder means from the casing.

Another feature of this invention includes a hook means for locking the lamp holder means in the casing.

Another feature of this invention includes a pin laterally movable in the lamp holder means to aid in removing the pushbutton assembly means from the casing.

Another feature of this invention includes cams at the ends of such pin for releasing such hook means.

Other features of this invention are apparent from this description, the appended claimed subject matter, and/or the accompanying drawings, in which:

Certain words may be used in this specification and the claimed subject matter indicating direction, relative position, and the like. Such words are used for the sake of brevity and clearness. It is to be understood, however, that such words are used only in connection with the views of the drawings, and that in actual use, any parts or movements described by such words may have entirely different direction, relative position, and the like. Examples of such words are "vertical," "horizontal," "upper," "lower," and the like.

A switch assembly, according to this invention, may include a casing 20 having a pushbutton assembly means receiving aperture or upper end 22 of a tubular casing 20. A switch means 24 may be carried by or connected with the casing 20. If desired, such switch means 24 may be carried at the lower end 26 of the casing 20. A pushbutton means or pushbutton assembly means 28 is movable inwardly relatively to the casing aperture means 22 by an initial pushing-in action, such as shown in FIG. 9, where the pushbutton assembly means 28 has been pushed into the casing aperture 22 until stopped.

Locking means may be provided to lock the pushbutton means 28 by such initial pushing-in action of the pushbutton means 28 into the casing aperture means. Such locking means may include certain parts, including one or more inwardly biased spring locking members 30 which may include upper hooks 32. These hooks or latch means 32 are outwardly pressed against the inside of the casing 20, as indicated in dotted lines at 32A, by one or more flanges or extensions 34 of the pushbutton means 28, as the pushbutton means 28 is being pushed downwardly in FIG. 9 and before the pushbutton means 28 reaches the position shown in FIG. 9. As the pushbutton assembly is pushed down to its lower limit, the hooks 32 snap back inwardly to the full line positions shown in FIG. 10, so that the downward parts of the hook are over the flanges 34, to lock the lamp holder means 44 in the casing 20 and are ready to prevent complete upward or outward movement of the pushbutton means 28 from the casing 20, until released by the operations shown in FIGS. 9 and 10.

Figure 9:
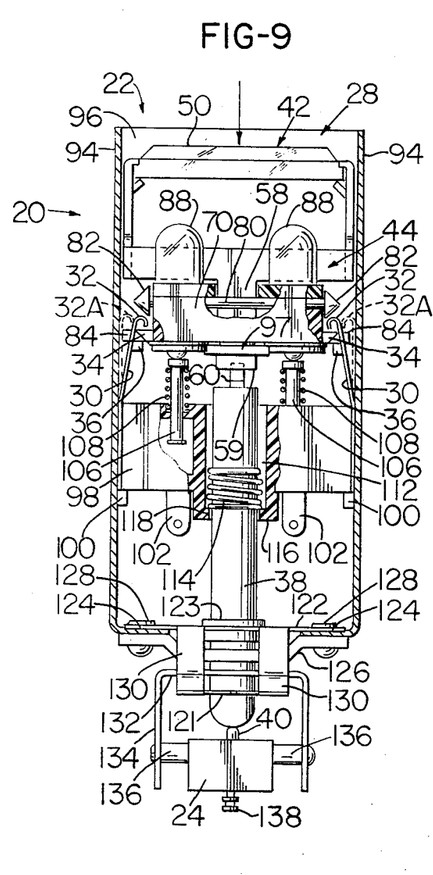
FIG. 9 is a view similar to FIG. 8, and showing the pushbutton assembly means initially inserted into the casing.

The distance apart, or shape, of the flanges 34, as compared to the distance apart, or shape, of the hooks 32 are such that the flanges 34 can wedge downwardly past the hooks 32 during the downward movement of the pushbutton means 28, in FIG. 9. However, such flanges 34 can be held by the hooks 32 after the flanges 34 have moved past the hooks 32.

The pushbutton assembly means 28 may be stopped at the position of FIG. 9 by stop members 36, which are inwardly bent fingers or flanges carried by the resilient inwardly biased locking members 30, for example.

Figure 10:
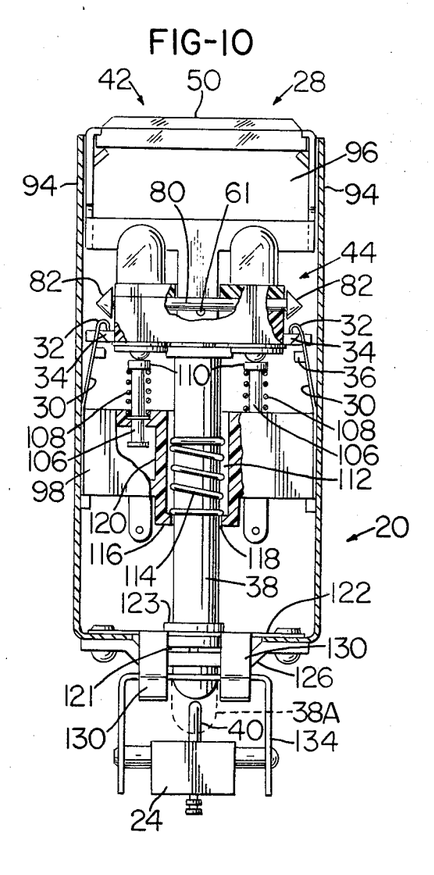
FIG. 10 is a view similar to FIG. 9, with the push actuator released from the position of FIG. 9 to assume a normally operative condition for repeated actuation and unactuation of the switch means.

FIG. 10 is the normally operable position for the pushbutton means 28 wherein thereafter the pushbutton means 28 may be repeatedly pushed in and released as often as desired. When the pushbutton means 28 is pushed in, this causes the plunger 38 to be pushed down to the dotted line position 38A which causes the end of the plunger 38 to push down the switch actuator 40 of the switch means 24. When the operator's finger is lifted from the pushbutton means, the plunger 38 can return to its upper full line position and unenergize the switch means 24. This pushing in and releasing action may be repeated as many times as desired.

Figure 11:
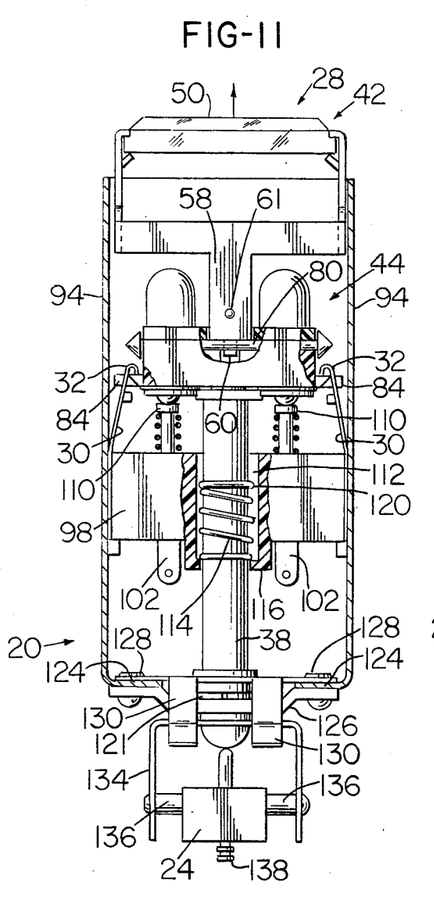
FIG. 11 is a view similar to FIG. 10 and showing the push actuator pulled outwardly of the casing preparatory to the removal of the pushbutton assembly means from the casing.
Figure 12:
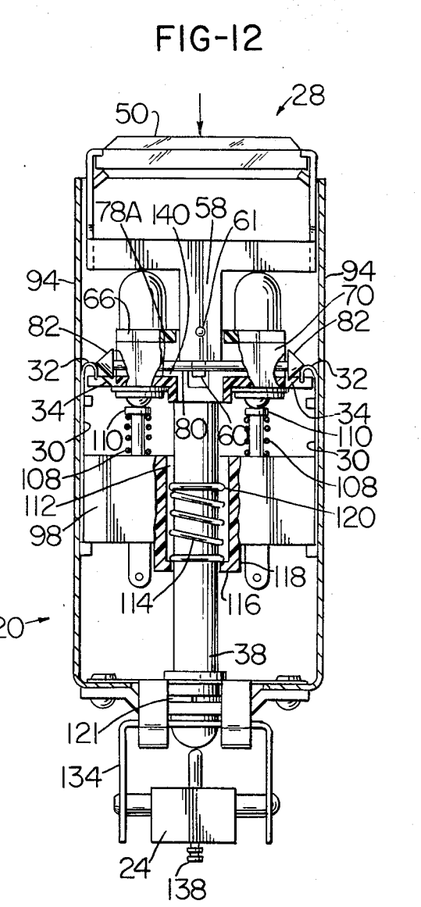
FIG. 12 is a view similar to FIG. 11 and showing the push actuator pushed inwardly to complete the release of the pushbutton assembly means from the casing, and ready for its removal from the casing.

Release means or withdrawing means may be provided to release or withdraw said pushbutton means 28 from the operable locked condition of FIG. 10 by an initial pulling out action of the pushbutton means as shown in FIG. 11, followed by a pushing in action on said pushbutton means 28, as shown in FIG. 12. The pushing in action of FIG. 12 conditions the pushbutton 28, so that it then may be pulled out of the casing 20 to and above the position shown in FIG. 8. Such pulling out action enables any servicing of the parts that might be desired. after which the pushbutton means may be pushed back into the casing 20 to repeat the sequences shown in FIGS. 9 and 10.

The foregoing actions which have been briefly described above may be accomplished because of details which will now be more fully described.

THE PUSHBUTTON ASSEMBLY MEANS 28

Figure 1:
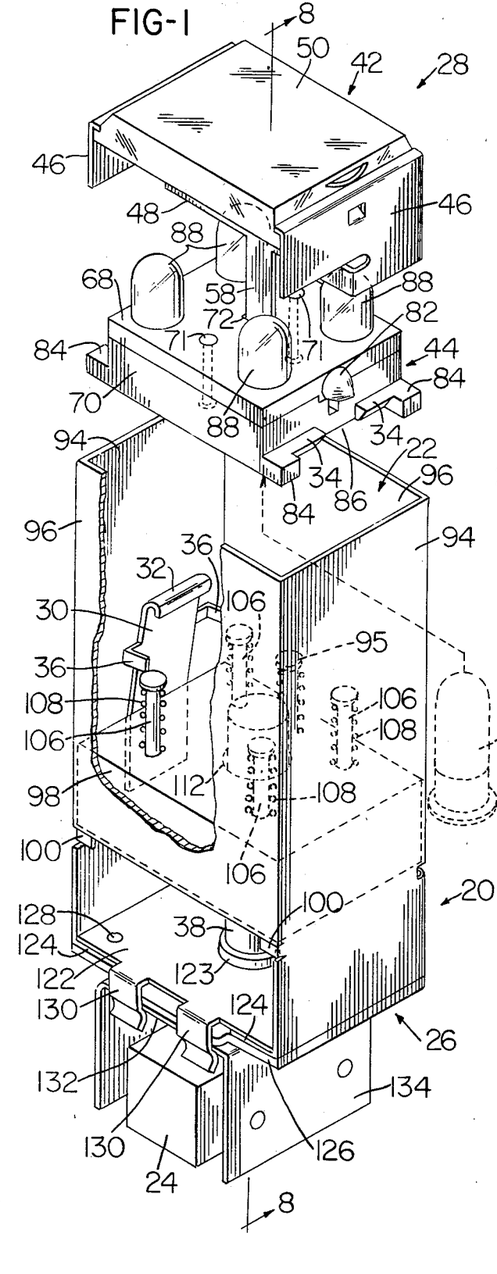
FIG. 1 is an exploded perspective view of a push button assembly means, casing and switch means, according to this invention.
Figure 6:
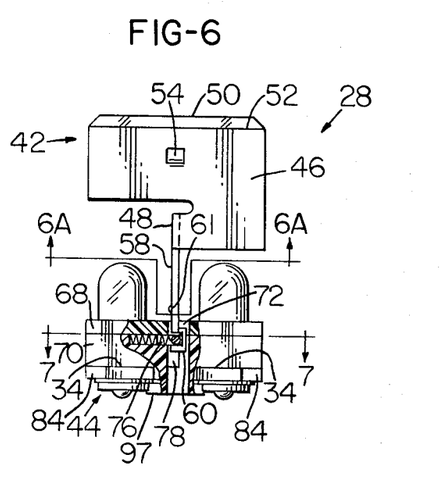
FIG. 6 is a transverse view of FIG. 5.
Figure 6A:
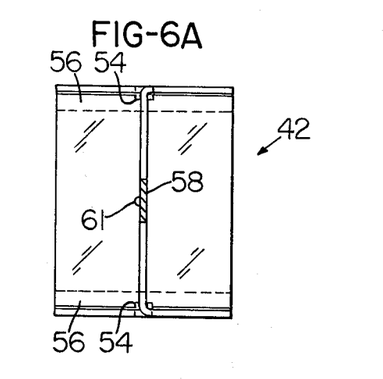
FIG. 6A is an upward cross section taken along the line 6A—6A of FIG. 6.

The pushbutton assembly means 28 may include an operator actuator means 42 which may be pushed down and released by an operator's finger and the like. Also the pushbutton assembly means 28 may include a lamp holder means 44. However, these members 42 and 44 are movable as a unit pushbutton assembly means 28, as shown in the various views. They are insertable in the casing 20 and removable from the casing 20 as shown in FIGS. 1 and 8–12. Additionally, the push actuator 42 is closely movable relatively to the lamp holding means 44 as shown in FIGS. 1–4, 8 and 9 or the actuator 42 may be relatively far from the lamp holder 44, as shown in FIGS. 5, 6, 7 and 10, 11 and 12. This relative movement between the push actuator 42 and the lamp holding means 44 is used properly to insert and lock the pushbutton means 28 in the casing 20, as shown in FIGS. 9 and 10, and to remove the pushbutton means from the casing 20, as shown in FIGS. 11 and 12. The showing in FIGS. 3 and 8 may be considered as showing the pushbutton means 28 in condition to be inserted into the casing 20. FIGS. 1 and 6 show the pushbutton means 28 as in the condition of having been just removed from the casing 20.

Details of the push actuator 42 will now be described.

THE PUSH ACTUATOR MEANS 42

The push actuator means 42 is best shown in FIGS. 2–7. The actuator means 42 may have two end walls 46 which are rigidly spaced and held by a crossbar member 48. The end walls 46 hold a push lens construction 50 by any suitable means. For example, flanges 52 on the end walls 46 and resilient lugs 54, which may be formed from the walls 46 hold the lens 50 in place. The flanges 52 and lugs 54 securely hold the lens flanges 52 and the resilient lugs 54. Any other lens holding construction may be used as desired.

Figure 2:
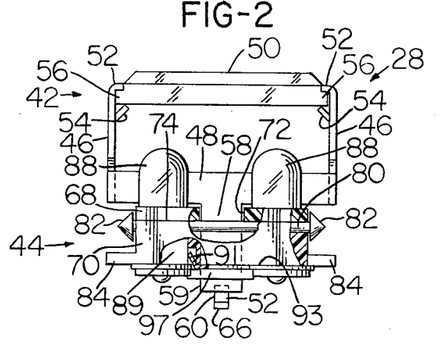
FIG. 2 is a front view of the pushbutton assembly means with the push actuator means and the lamp holder means moved together in readiness to be inserted into the casing.

The crossbar member 48 may have a downwardly directed vertical bar or extension 58, which extends downwardly into the lamp holding assembly 44, and which has a lower C-shaped end 60, which has a pin receiving cavity 62 formed by upper and lower walls 64 and 66. The vertical extension or bar 58 is upwardly and downwardly slidable in the lamp holding means 44 as will become apparent. The lower C-shaped end of bar 58 is narrower than the main body of the bar 58, the main body of the bar 58 having a wide end 59, as shown in FIG. 2.

The lamp holding means 44 will now be described.

THE LAMP HOLDING MEANS 44

The lamp holding means or assembly 44 may include a thin generally flat upper section 68 and a thick generally flat lower section 70. These two sections 68 and 70 may be secured together by rivets 71, FIG. 3A, or the like.

The upper section 68 has generally flat upper and lower surfaces and has an opening 72 slidably to receive the bar 58. Such opening 72, FIG. 3, has a wide part and a narrow part to be aligned with corresponding opening 73 with wide and narrow parts 73A and 73B of the lower section 70, FIG. 4. These wide and narrow parts receive respectively the wide body of member 58 and the narrow C-shaped end 60 of said member 58.

The lower section 70 has a generally flat upper surface 74 which abuts the generally flat lower surface of the upper section 68. The lower section 70 also has a shallow groove 76 and a deeper groove 78. These grooves 76 and 78 receive the release pin 80, which has cams in the form of conical end pieces 82. The pin reciprocates back and forth between these two grooves 76 and 78, as shown by different positions in FIGS. 4 and 7.

Figure 13:
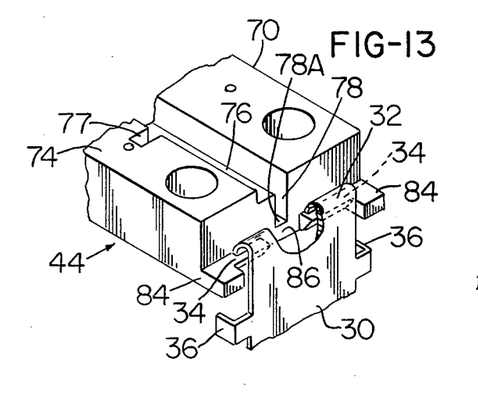
FIG. 13 is a perspective view of the lower section of the lamp holder assembly and of the resilient latching member.

The lower section 70 has shorter end flanges 34 and longer end flanges 84. The shorter flanges 34 terminate centrally of the lower section 68, to provide a cavity 86, which receives the conical end pieces 82 of the pin 80, and allows the pin 80 to move down to the bottom of the deeper groove 78, without interference by the shorter flanges 34. The longer flanges 84 receive the locking member 30 between them, as shown in FIG. 13. The shorter flanges 34 permit the locking member 30 to move inwardly between the longer flanges 84, as shown in FIGS. 9, 10 and 11.

Figure 3:
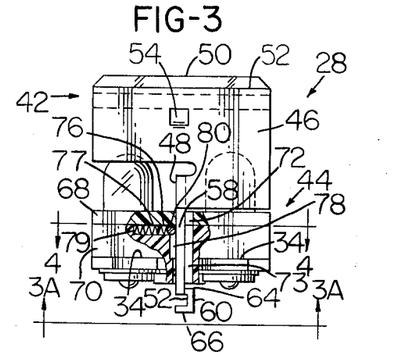
FIG. 3 is a transverse view of FIG. 2.
Figure 3A:
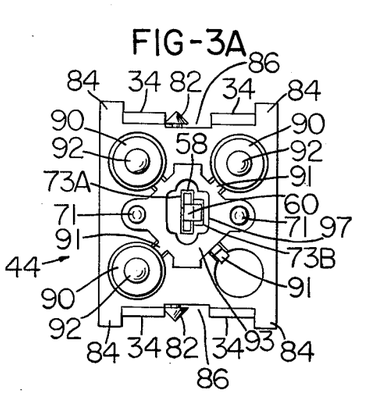
FIG. 3A is an upward view taken from line 3A—3A of FIG. 3.
Figure 4:
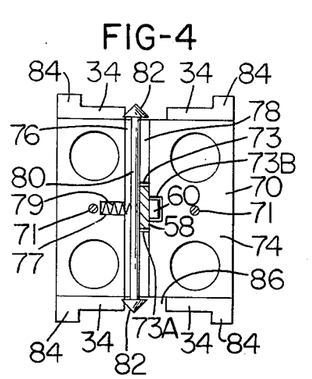
FIG. 4 is the diagrammatic cross section taken along the line 4—4 of FIG. 3.
Figure 5:
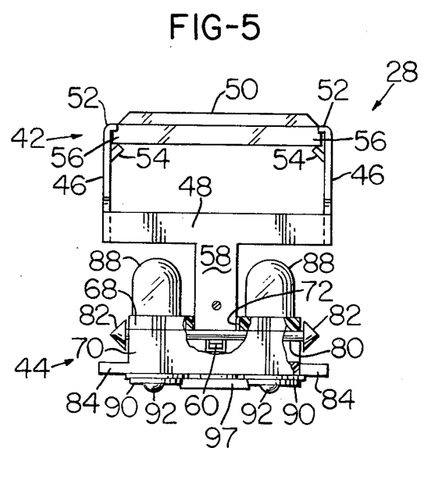
FIG. 5 is a front view, similar to FIG. 2, but showing the push actuator and the lamp holder means spread apart.
Figure 7:
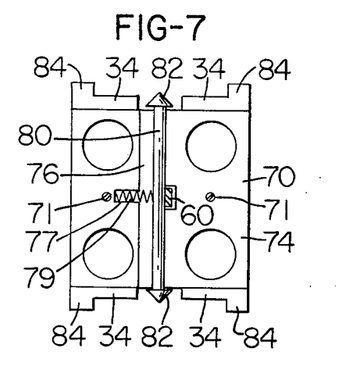
FIG. 7 is a diagrammatic cross section taken along the line 7—7 of FIG. 6.

The release pin 80 is movable back and forth into the shallower groove 76 under certain conditions. For example, the pin 80 may be in the shallow groove 76, as shown in FIGS. 3 and 4, or it may be movable up and down in the deeper groove 78 under other conditions, such as shown in FIGS. 6, 7 and 9.

The lower section 70 also has a sidewise groove 77, which contains a compression spring 79, which pushes the release pin 80 into the C-shaped end of the bar 58, when such C-shaped end 60 is in its upper position, shown in FIG. 6. The spring 79 arrested from rightward movement by the vertical member 58, when such member 58 is moved downwardly with the pin 80 to the position in FIG. 12.

The lamp holder assembly 44 may have one or more flange-type of lamps 88, which have lower flanges 90, with central contacts 92. These lamps may be pulled downwardly out of the lamp holder assembly 44, when such assembly 44 is out of the casing 20, as in FIGS. 1 and 8 in a manner now well known. The lamps 88 are downwardly slidable in openings of a suitable character in the lamp assembly 44. The glow of these lamps is visible through the lens 50. If desired, the upper ends of the lamps 88 may be covered with flexible colors, not shown, which cause individual lamps to display different colors, also as is well known.

The lamps 88 have cylindrical metallic contacts 89, FIG. 2, which are contacted by inward resilient flange contacts 91. The flange contacts 91 are integral with and carried by a thin metal plate 93 which is riveted to the lower section 70 by rivets 71 which rivet the sections 68 and 70 together. The plate 93 forms the "neutral" terminal for lamp contacts 91. The plate may be contacted by a neutral upward contact member 95 which may be similar to but of opposite polarity from the contact members 106 to be described.

The lamp assembly 44 is movable into and out of the casing 20 along with the push actuator 52, as shown in various figures, with relative movement between the assembly 44 and actuator 42. The lower section 70 has a downward extension 97 which passes through an opening in the plate 93, FIGS. 2 and 3A. The extension 97 has an opening similar to openings 72 and 73 to receive the wide part of bar 58 and narrow C-shaped end 60.

The casing 20 will now be more fully described.

THE CASING 20

The casing 20 may be a tubular casing, and if desired, may be rectangular or square. Such casing may have opposite short walls 94 and opposite long walls 96, which may be joined together by any suitable means, such as by being partly or wholly integral with each other, or welded together, etc.

A terminal block 98 may be secured in the casing 20 by any suitable means. For example, it may rest on downward limit lugs or rods 100, which may be secured in the walls 94 and/or 96 by welding, adhesion, and the like, to locate the block 98, etc., with tabs (not shown) formed from the casing 20 and bent inwardly and received above a shoulder (not shown) formed in the block 98. The inwardly biased locking members 30 may each have hooks or hook means 32 which engage the flanges 34. Such locking member 30 also may have stops or stop members 36 which are engaged by the shorter end flanges 34 or the longer flanges 84 of the lower section 70, as shown in FIG. 9. The inwardly biased locking member 30 may extend downwardly between the casing end wall 94 and the terminal block 98. If desired, a suitable groove may be provided in the block 98 to receive the lower end of the locking member 30 between the block and casing wall. The block 98 is provided with perforate electrical terminals 102, to which power supply wires may be attached. These terminals 102 pass through the terminal block 98 and have horizontally bent ends 104 which are perforated to receive the contact supporting rods 106 which are upwardly biased by the compression springs 108, the upper ends of which upwardly push the lamp energizing contacts 110 which are contacted by the lamp central contacts 92. This applies one polarity to the central contacts 92. The opposite polarity is applied by the similar terminal 91 and cylindrical lamp contacts 89, FIG. 2.

An opening 112 is provided to receive the plunger 38, and the upwardly biasing plunger spring 114. The lower end of the spring 114 engages the lower flange 116 in the terminal block 98, and which surrounds the opening 118, through which the plunger 38 passes. The upper end of the plunger has a split ring 120 fixed in a groove in the plunger 38, against which the compression spring 114 engages, and pushes the plunger 38 upward. The upward motion of the plunger 38 is arrested by the plunger split ring 121 which upwardly engages the plunger flanged bearing member 123 which is secured to the bracket supporting plate 122. The plunger 38 passes through the bearing member 123 and a suitable opening in the bottom plate 126.

The lower end of the casing 20 has inward flanges 124, to which the bottom plate 126 is secured by the rivets 128. The plate 122 is also secured in place by the rivets 128.

The plate 122 has downward spring clips 130 which support and secure the top plate 132 of the bracket 134. The bracket 134 supports the switch means 24 by the supports 136, which may be of the sleeve and rivet type. The switch means has terminals 138, to which connecting wires may be secured, which wires may be part of a circuit to be controlled by the switch means 24.

OPERATION.—INSERTION OF PUSHBUTTON ASSEMBLY MEANS 28 INTO CASING 20

Before the pushbutton means 28 is inserted into the aperture 22, FIG. 2, the actuator 42 and the lamp assembly 44 must be closely adjacent each other, as shown in FIGS. 2–4.

When the pushbutton assembly means 28 is inserted in the casing 20, and before it reaches the position in FIG. 9, the beveled ends of the short flanges 34 of the lower section 70 engage the hook members 32 and push them outwardly to the dotted line positions 32A of FIG. 9, and then when the lower section 70 reaches the full line position of FIG. 9, and the flanges 34 pass under the hook members, the hook members 32A spring inwardly to the full line position with their hooks 32 over the shorter flanges 34 to lock the lamp assembly in the casing 20.

During the downward motion of the pushbutton means 28 prior to reaching the position of FIG. 9, the end 59 of the extension 58 and C-shaped end 60 have extended below the downward extension 97 and have pushed the upper end of plunger 38 downwardly so that the lower end of the plunger engages and pushes down the switch means actuator 40, FIG. 9. When the operator's finger is removed from the lens 50, the plunger spring 114 and contact springs 108 push the lamp assembly 44 upward to the position of FIG. 10, with the downward parts of the hooks 32 engaging the shorter flanges 34, to prevent any further upward movement of the lamp assembly 44. Thereafter, the actuator 42 may be pushed downwardly by the operator's finger, and later released as often as desired, to actuate and unactuate the switch means 24 by means of the plunger 38.

The vertical extension bar 58 has a detent 61 which provides sufficient resistance to the upward movement of the actuator 42 in FIG. 10 so that the springs 108 cannot move the vertical bar 58 and the actuator 42 beyond the point of FIG. 10 but permit the actuator 42 to be pushed downwardly so that lower end of the plunger 38 may move to the position 38A to actuate the switch actuator 42.

During the upward movement from the first release of the actuator from the position of FIG. 9, the upper end of the plunger 38 pushes the C-shaped end 60 into the downward extension 97 and pushes the vertical bar 58 upward through the sections 68 and 70 until the detent 61 engages the pin 80, which normally prevents the actuator 42 from moving farther upward than in FIG. 10. The sections 68 and 70 are stopped from upward movement by the hooks 32 acting on the flanges 34. The plunger 38 is stopped from further upward movement by the extension 97 and/or split ring. Therefore, the push actuator 42 is in "ready to operate" condition for repeated downward actuation and release.

REMOVAL OF PUSHBUTTON ASSEMBLY MEANS 28 FROM CASING 20

Figure 8:
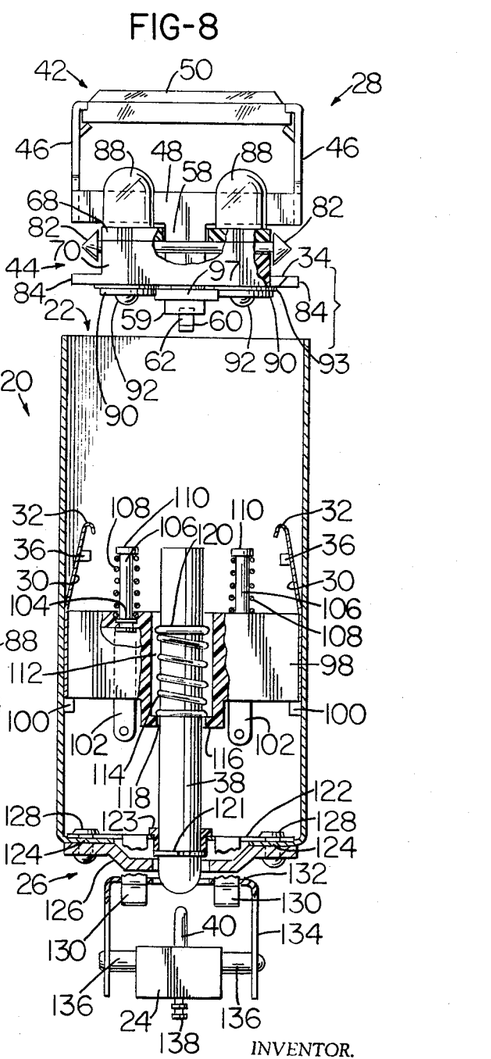
FIG. 8 is an exploded cross section taken along the line 8—8 of FIG. 1.

The removal from the casing 20 of the pushbutton assembly means 28, including the actuator 42 and lamp holder means 44 is accomplished by (a) pulling out the actuator 42 to the position of FIG. 11 from that of FIG. 10, until it stops, (b) then pushing the actuator 42 to the position of FIG. 12, (c) then releasing the actuator 42, (d) then lifting the actuator 42 and lamp holder means 44 out of the casing 20 to a position similar to that shown in FIGS. 1 and 8.

The outward pulling action of FIG. 11 causes the extension bar 58 to be pulled up. The detent 61 pushes the pin 80 forward in FIG. 11 or leftward in FIG. 3, before the position of FIGS. 11 and 6 is reached. In the position of FIGS. 11 and 6 the pin 80 enters the C-shaped end 60 of bar 58.

The inward push of FIG. 12 pushes down the bar 58, bar end 60 and pin 80 until the pin end cones 82 engage the hooks 32 and push the hooks 32 completely outward, as shown in FIG. 12. This places the hooks 32 to be outward of the short flanges 34. At the same time the lamp holder sections 68 and 70 have been pushed up by the contacts 110 and contact springs 108 so that the flanges 34 have slipped up above the inner ends of the hooks 32, as shown in FIG. 12. This upward movement of the sections 68 and 70 is accomplished because of the clearance 140 between the bottom 78A of the groove 78, FIGS. 12 and 13, and the bottom of the rod 80. This permits the sections 68 and 70 to be pushed up by springs 108 while the operator's finger holds down the actuator 42 and pin 80. All of the parts of the actuator 42 and lamp holder 44 are now radially inward of the hooks 32 and are free to be lifted up out of the casing 20.

It is thus to be seen that a casing 20 has been provided with a casing aperture means 22. Switch means 24 is connected to the casing. A pushbutton assembly means 28 includes the push actuator means 42 and the lamp holder means 44, which are relatively, movably and unitarily secured together. The actuator means 42 and lamp holder means 44 are insertable in and removable from the casing 20 as a unit.

The switch means 24 is actuatable to actuated condition and unactuated condition by pushing in action and release action on the push actuator means 42.

Locking means are provided to lock the lamp holder means 44 in locked condition in the casing 20 by an initial pushing in action of the push actuator means 42, as shown and described in connection with FIG. 9. This is followed by a releasing action of said push actuator means 42 as shown and described in connection with FIG. 10. This includes hook or latch means 32 movably carried by the casing 20 and locking the lamp holder means during the initial pushing in action, as shown in FIG. 10.

Withdrawing means to withdraw the lamp holder means 44 from the locked condition of FIG. 10 are provided. This includes the pulling out action on the push actuator means 42, as described and shown in FIG. 11, followed by a releasing pushing in action of the push actuator means 42 as described and shown in FIG. 12.

The lamp holder means 44 includes a lamp holding base made of sections 68 and 70. A release pin or pin means 80 is movable laterally in the lamp holding base. Such pin or latch means 80 is operable to hold the latch or hook means 32 away from the lamp holder means 42 during the withdrawing action as described and shown in FIG. 12.

There are two inwardly biased hooks 32, FIG. 12. The pin means 80 is a laterally movable pin which has pin end cam means or cone-like construction 82 to hold the hooks 32 away from the lamp holder means 44 during the withdrawing action, as in FIG. 12.

A terminal block 98 is secured in the casing 20 and has upwardly spring biased terminal contacts 122 and 123 to engage the lamp contacts of the lamps 64 to be inserted in the lamp holder means 44. The terminal contacts 122 and 123 upwardly bias the lamp holder means 44 against the hooks 32 during the withdrawing action as previously described in connection with FIG. 11. Likewise 98 has the upwardly spring biased plunger 38 which is downwardly and upwardly actuated and released by operation of the push actuator means 42 in the operating condition of FIG. 10.

The push actuator 42 has a downward vertical bar 58 that passes through the lamp holder means 44. Such bar 58 has a C-shaped end 60, FIGS. 3 and 6, which has a cavity into which the release pin 80 is movable in and out of which said pin is removable during the pulling out and pushing in actions of the actuator mean 42.

The casing 20 may be tubular and rectangular in cross section with the aperture means 22 being at one end and the switch means 24 at the other end. The hooks 32 are carried by opposite sides of the casing and the terminal block 98 is secured to at least one or more of the casing sides.

The latch or hook means 32 also includes an inwardly biased resilient member or leaf spring 30 having latch means or hooks 32 which latch or hook the lamp holder part 42 of the pushbutton assembly means 28.

The lamp holder means 44 has a beveled surface 34, FIGS. 9 and 10, which is a latch 32 outward moving surface means to move the latch means 32 outwardly as shown in dotted lines, FIG. 9. There is also a latch inward release means surface means or the flat surface above beveled surface 34 to cause the latch means 32 to latch the lamp holder means 44, as shown in full lines, FIGS. 9 and 10.

A new, useful and unobvious switch construction has thus been provided.

What is claimed is:
1. In combination:
a casing having a receiving casing aperture means;
switch means connected to said casing;
pushbutton assembly means including an inward push actuator means and a lamp holder means relatively movably unitarily secured together and being insertable and removable from said casing as a unit, said pushbutton assembly means being disposed in said aperture means and when in a locked condition thereof having said push actuator means operatively associated with said switch means, said switch means being actuatable to actuated condition and unactuated condition by said push actuator means upon a pushing in action and release action on said push actuator means,
locking means carried by said casing and said pushbutton assembly means locking said lamp holder means in said locked condition in said casing by an initial pushing in action of said push actuator means, followed by a releasing action of said push actuator means, and including latch means movably carried by said casing and locking said lamp holder means during said initial pushing in action;
and withdrawing means carried by said pushbutton assembly means and operatively associated with said latch means for moving said latch means to an unlocking position thereof to withdraw said lamp holder means from said locked condition by a pulling out action on said push actuator means followed by a releasing pushing in action of said push actuator means.

2. A combination according to claim 1 in which said latch means is a hook means.

3. A combination according to claim 1 in which said push actuator means has a lens means to be actuated toward said aperture means.

4. In combination:
a casing having a receiving casing aperture means;
switch means connected to said casing;
pushbutton assembly means including an inward push actuator means and a lamp holder means relatively movably unitarily secured together and being insertable and removable from said casing as a unit, said pushbutton assembly means being disposed in said aperture means and when in a locked condition thereof having said push actuator means operatively associated with said switch means, said switch means being actuatable to actuated condition and unactuated condition by said push actuator means upon a pushing in action and release action on said push actuator means;
locking means carried by said casing and said pushbutton assembly means locking said lamp holder means in said locked condition in said casing by an initial pushing in action of said push actuator means, followed by a releasing action of said push actuator means, and including latch means movably carried by said casing and locking said lamp holder means during said initial pushing in action;
and withdrawing means carried by said pushbutton assembly means and operatively associated with said latch means for moving said latch means to an unlocking position thereof to withdraw said lamp holder means from said locked condition by a pulling out action on said push actuator means followed by a releasing pushing in action of said push actuator means;
said lamp holder means comprising a lamp holding base with a release pin means laterally movable in said base, said pin means defining said withdrawing means and being operable to hold said latch means away from said lamp holder means during said withdrawing action.

5. A combination according to claim 4 in which said latch means includes two inwardly biased hooks on opposite sides of said casing, and said pin means has pin end cam means on each pin end to engage said two hooks to hold said hooks away from said lamp holder means during said withdrawing action.

6. A combination according to claim 5 in which a terminal block is secured in said casing and has upwardly spring biased terminal contacts to engage lamp contacts on lamps to be inserted in said lamp holder means, said terminal contacts upwardly biasing said lamp holder means against said hooks during said withdrawing action.

7. A combination according to claim 5 in which said terminal block has an upwardly biased plunger which is downwardly actuated and released by operation of said push actuator means while said pushbutton assembly means is in said operating condition.

8. A combination according to claim 7 in which said push actuator has a downward vertical bar which passes downwardly into said lamp holder means, said vertical bar having a C-shaped end which has a cavity into which said release pin is movable and out of which said pin is removable during said pushing in and release actions and said pulling out and pushing in actions of said push actuator means.

9. A combination according to claim 8, in which said casing is a tubular rectangular casing with opposite sides and with said aperture means being at one end of said casing and said switch means being at the other end of said casing, with said two hooks being carried by opposite sides of said casing, with said terminal block being secured to at least one of said casing sides.

10. In combination:
a casing having a receiving casing aperture means;
switch means connected to said casing;
pushbutton assembly means including an inward push actuator means and a lamp holder means relatively movably unitarily secured together and being insertable and removable from said casing as a unit, said pushbutton assembly means being disposed in said aperture means and when in a locked condition thereof having said push actuator means operatively associated with said switch means, said switch means being actuatable to actuated condition and unactuated condition by said push actuator means upon a pushing in action and release action on said push actuator means;
locking means carried by said casing and said pushbutton assembly means locking said lamp holder means in said locked condition in said casing by an initial pushing in action of said push actuator means, followed by a releasing action of said push actuator means, and including latch means movably carried by said casing and locking said lamp holder means during said initial pushing in action;
and withdrawing means carried by said pushbutton assembly means and operatively associated with said latch means for moving said latch means to an unlocking position thereof to withdraw said lamp holder means from said locked condition by a pulling out action on said push actuator means followed by a releasing pushing in action of said push actuator means;
said latch means comprising a resilient member secured to said casing and having a latching end which latches a part of said pushbutton assembly means to lock said lamp holder means in said casing.

11. A combination according to claim 10 in which said resilient member is a leaf spring with one part secured to said casing and with said latching end resiliently biased inward in said casing.

12. A combination according to claim 1 with said releasing pushing action being followed by a withdrawing action from said casing on said push actuator means.

13. In combination:
a casing having a receiving aperture means;
a switch means connected to said casing;
a push actuator means and a lamp holder means relatively movably unitarily secured together and being insertable in and removable from said casing as a pushbutton unit through said aperture means, said pushbutton unit being disposed in said aperture means and when in locked condition thereof having said push actuator means thereof operatively associated with said switch means, said switch means being actuatable to actuated condition and unactuated condition by said push actuator means upon a pushing in action and release action on said push actuator means;
locking means carried by said casing and said pushbutton unit locking said lamp holder means in said locked condition in said casing by an initial pushing in action of said push actuator means and said lamp holder means, followed by a releasing action of said push actuator means, said locking means including inwardly biased latch means carried by said casing which latch means is outwardly moved by said lamp holder means during said pushing in action, and which latch means inwardly moves by bias action to latch said lamp holder means during said pushing in action;
and locking release means carried by said pushbutton unit and being operatively associated with said latch means to release said lamp holder means from locked condition by a pulling out action on said push actuator means followed by a releasing pushing in action of said push actuator means.

14. A combination according to claim 13 in which said latch means moves into latching engagement with said lamp holder means during said pushing in action.

15. A combination according to claim 13 in which said lamp holder means has latch outward moving surface means to move said latch means outwardly and latch inward release surface means to cause said latch means to latch said lamp holder means.

16. A combination according to claim 15 in which said latch means is a hook means, and said outward moving surface means is a bevel surface to move said hook means outwardly and said inward release surface means is a hooking engagement surface to hook said lamp holder means in locked condition.

17. A combination according to claim 13 in which said lamp holder means has laterally movable release pin means defining said locking release means and operable to hold said latch means from latching said lamp holder means during said releasing pushing in action.

18. A combination according to claim 13 in which cam means are provided to define said locking release means and to hold said latch means from latching said lamp holder means during said releasing pushing in action.

19. A combination according to claim 13 in which said lamp holder means has pin means defining said locking release means and operable to hold said latch means from latching said lamp holder means during said releasing pushing in action.

20. A combination according to claim 19 in which cam means are provided on said pin means to hold said latch means from latching said lamp holder means during said releasing pushing in action.

21. A combination according to claim 20 in which said cam means are provided at opposite ends of said pin means.

22. A combination according to claim 21 in which said cam means are cone-like constructions.

23. A combination according to claim 22 in which said pin means is a laterally movable pin having cone-like constructions at each end.

24. A combination according to claim 23 in which a switch means actuating plunger has a switch means actuating end and an actuator actuated end and is biased toward said actuator, said actuator having a vertical actuator bar extending through said lamp holder means with a C-shaped bar end engaging and actuating said plunger actuated end.

25. A combination according to claim 24 in which said C-shaped bar end receives said laterally movable release pin during said pulling out action and said releasing pushing in action to cause said pin cone-like constructions to hold said latch means from latching said lamp holder means during said releasing pushing in action.

26. A combination according to claim 13 in which said inwardly biased latch means has stop means to limit the inward pushing action of said lamp on said lamp holder means.

References Cited
UNITED STATES PATENTS

| | | |
|---|---|---|
| 2,904,662 | 9/1959 | Spring. |
| 3,090,949 | 5/1963 | Hallerberg _________ 200—159 |
| 3,197,598 | 7/1965 | Andersen et al. |
| 3,249,705 | 5/1966 | Amis et al. |
| 3,267,245 | 8/1966 | Vincent. |
| 3,274,354 | 9/1966 | Stevens. |

HERMAN O. JONES, Primary Examiner